J. STEPHENSON.

STREET-CAR.

No. 7,176. Reissued June 13, 1876.

Witnesses.

L. Van Riswick.

D. G. Stuart

Inventor

John Stephenson per L. Hinman

Atty.

N. PETERS, PHOTO-LITHOGRAPHER, WASHINGTON, D. C.

UNITED STATES PATENT OFFICE.

JOHN STEPHENSON, OF NEW YORK, N. Y.

IMPROVEMENT IN STREET-CARS.

Specification forming part of Letters Patent No. 61,482, dated January 22, 1867; reissue No. 6,696, dated October 11, 1875; reissue No. 6,985, dated March 7, 1876; reissue No. 7,176, dated June 13, 1876; application filed May 5, 1876.

DIVISION E[3].

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
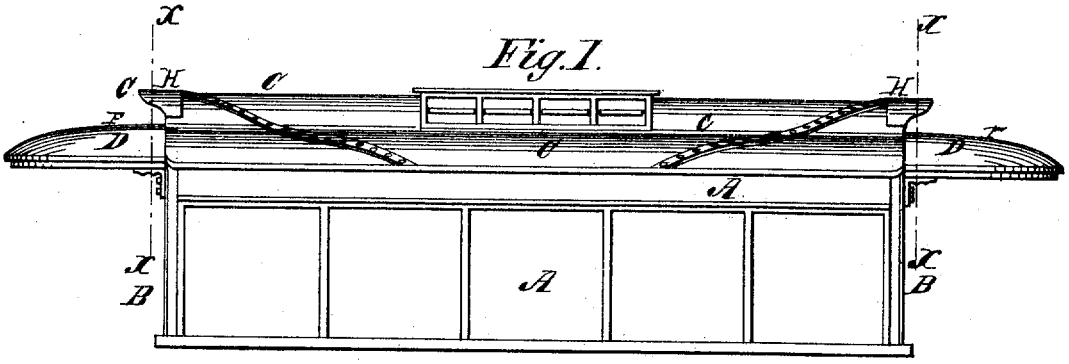
Figure 2:
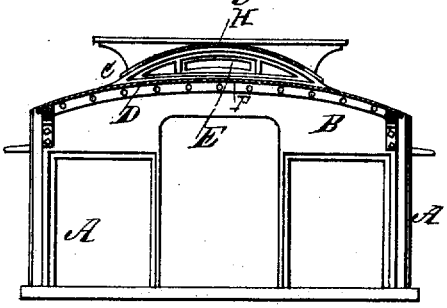
Figure 3:
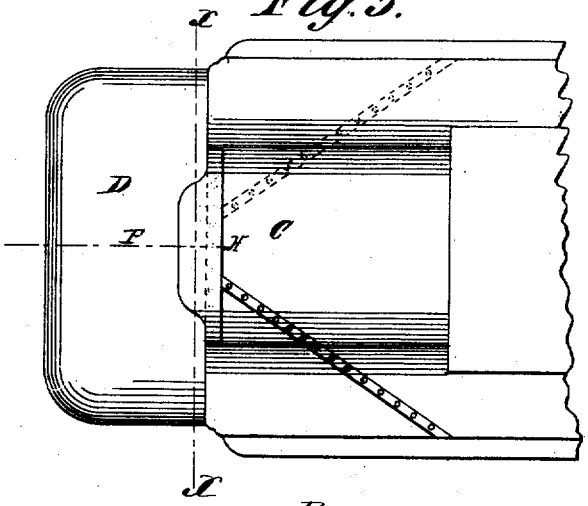
Figure 4:
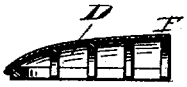

Figure 1 represents a side elevation of the upper portion of a street-car to which my improvement has been applied; and Fig. 2, a vertical transverse section of the same, as taken through the line *x x* of Figs. 1 and 3, looking toward the car-body. Fig. 3 represents a plan or top view of one end of the car, the other half being broken off; and Fig. 4, a vertical longitudinal section of the canopy, as taken in the line of the length of the car, and from which it is represented as being detached.

This division of my invention relates to the construction of the roofs of street-cars. In these, as heretofore constructed, the end roof, which covers and protects the platform, has formed a continuation or extension of the main roof.

Experience has demonstrated, first, that when the end roof or canopy is made as high as the main roof it affords very imperfect shelter from sun and storm; secondly, that the continuation of the plane of the main roof into the canopy prevents useful employment of an opening into the car immediately under the ridge of the roof, either for the purpose of ventilation or for signal, and for both of which it is essential. Besides these points the long ridge-line of the continuous roof is inelegant, and gives to the car a cumbersome and top-heavy appearance.

My improvement remedies these objections; and its nature consists in forming and arranging the canopy or covering for the platform with its central or ridge part in a plane below the plane of the ridge of the main roof.

To enable others skilled in the art to make, construct, and use my invention, I will now proceed to describe its parts in detail, omitting a particular description of those parts of a street-car an acquaintance with which is unnecessary to a full understanding of the present improvement.

Each letter of reference in the drawing indicates the same part in the different figures.

A represents the upper portion of the car-body; B B, its ends, and C the main roof of the car. This roof may be constructed in any of the known ways or forms; but it is preferred to make it with sufficient rise or arch in the middle to admit of the use of openings E at each end of the car above the door—*i. e.*, between the main roof and the sheltering-canopy or end roof D—in which case the length of its ridge-line or arched portion F should be shortened, so as to terminate at or near the end of the car-body.

The end roof, which forms the canopy D, that covers or protects the driver's or conductor's platform, is so made and arranged that its central part or ridge F shall lie in a plane below the ridge-line H of the main roof C, as shown in Figs. 1 and 2. Thus constructed, it not only affords unobscured and unobstructed space for the purposes of ventilation and signal through the openings E above it, but it also provides ample protection to parties on the platform from the sun and storm.

Having described my invention, I claim—

A street-car having the canopy or roof D, which shelters the platform, made or arranged in a plane lower than the plane of the ridge of the main roof which covers the car-body, substantially as set forth.

In testimony that I claim the foregoing I have hereunto set my hand this 29th day of April, 1876.

JOHN STEPHENSON.

Witnesses:

STUART A. STEPHENSON,
WILLIAM J. WALKER.